(12) United States Patent
Tachibana (10) Patent No.: US 12,189,360 B2
(45) Date of Patent: Jan. 7, 2025

(54) MANUFACTURING FACILITY DIAGNOSIS SUPPORT APPARATUS

(71) Applicant: Toshiba Mitsubishi-Electric Industrial Systems Corporation, Tokyo (JP)

(72) Inventor: Minoru Tachibana, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 17/597,309

(22) PCT Filed: Jul. 1, 2020

(86) PCT No.: PCT/JP2020/025867
§ 371 (c)(1),
(2) Date: Jan. 3, 2022

(87) PCT Pub. No.: WO2022/003871
PCT Pub. Date: Jan. 6, 2022

(65) Prior Publication Data
US 2022/0317655 A1  Oct. 6, 2022

(51) Int. Cl.
*G05B 19/4063* (2006.01)
*G05B 23/02* (2006.01)

(52) U.S. Cl.
CPC ..... *G05B 19/4063* (2013.01); *G05B 23/0205* (2013.01)

(58) Field of Classification Search
None
See application file for complete search history.

(56) References Cited

U.S. PATENT DOCUMENTS

| | | | | |
|---|---|---|---|---|
| 6,112,658 | A | * | 9/2000 | Gunther ................ B26D 5/007 101/171 |
| 2006/0149407 | A1 | | 7/2006 | Markham et al. |
| 2019/0339688 | A1 | | 11/2019 | Cella et al. |

FOREIGN PATENT DOCUMENTS

| | | |
|---|---|---|
| JP | 2001-356801 A | 12/2001 |
| JP | 2002-232969 A | 8/2002 |

(Continued)

OTHER PUBLICATIONS

Phaniraj, Madakasira, et al. "Thermo-mechanical modeling of two phase rolling and microstructure evolution in the hot strip mill: Part I. Prediction of rolling loads and finish rolling temperature." Journal of Materials Processing Technology 170.1-2 (2005) (Year: 2005).*

(Continued)

*Primary Examiner* — Carlos R Ortiz Rodriguez
(74) *Attorney, Agent, or Firm* — XSENSUS LLP (57) ABSTRACT

There is provided a manufacturing facility diagnosis support apparatus that can support efficient diagnosis of a manufacturing facility even when past operation information on the manufacturing facility is not present. The diagnosis support apparatus includes a storage unit configured to store operation information in each of processes of a manufacturing facility for processing a material and information on a position of the material in association with each other, and an extraction unit configured to extract, when a range including the position of the material is designated, operation information changed at a position corresponding to the designated range, from the operation information stored in the storage unit. According to the diagnosis support apparatus, it is possible to support efficient diagnosis of the manufacturing facility even when the past operation information on the manufacturing facility is not present.

12 Claims, 4 Drawing Sheets

(56) References Cited

FOREIGN PATENT DOCUMENTS

| JP | 2005-165546 | A  | 6/2005  |
|----|-------------|----|---------|
| JP | 2013-180322 | A  | 9/2013  |
| JP | 2017-188015 | A  | 10/2017 |
| JP | 2019-48337  | A  | 3/2019  |
| JP | 2019-074969 | A  | 5/2019  |
| JP | 6572979     | B2 | 9/2019  |
| WO | 2017/134772 | A1 | 8/2017  |

OTHER PUBLICATIONS

Benasciutti, Denis. "On thermal stress and fatigue life evaluation in work rolls of hot rolling mill." The Journal of Strain Analysis for Engineering Design 47.5 (2012): 297-312. (Year: 2012).*

International Search Report and Written Opinion mailed on Oct. 6, 2020, received for PCT Application PCT/JP2020/025867, Filed on Jul. 1, 2020, 8 pages.

Office Action mailed on Sep. 2, 2021, received for Taiwan Application 110104247, 16 pages including English Translation.

Notification of Transmittal of Translation of the IPRP mailed Jan. 12, 2023, and English translation of International Search Report and Written Opinion issued Oct. 6, 2020, in corresponding International Application No. PCT/JP2020/025867, 5 pp.

Japanese Office Action issued Dec. 28, 2022 in corresponding Japanese Patent Application No. 2021-535134 (with machine-generated English translation), 4 pages.

Office Action issued on Mar. 29, 2022, in corresponding Taiwanese patent Application No. 110104247, 12 pages.

Office Action issued on Aug. 2, 2022, in corresponding Japanese patent Application No. 2021-535134, 3 pages.

Japanese Office Action dated Jan. 18, 2022, issued in corresponding Japanese Patent Application No. 2021-535134.

Office Action issued Feb. 28, 2023 in Indian Patent Application No. 202217000198, 6 pages.

Chinese Office Action issued Jul. 24, 2023 in corresponding Chinese Patent Application No. 202080054364.1 (with machine-generated English translation), 18 pages.

Japanese Office Action issued Sep. 5, 2023 in corresponding Japanese Patent Application No. 2021-535134 (with machine-generated English translation), 12 pages.

Office Action issued Dec. 27, 2023 in corresponding Chinese Patent Application No. 202080054364.1 and computer-generated English translation thereof.

Hearing Notice issued Feb. 12, 2024 in corresponding Indian Patent Application No. 202217000198 (English translation included).

Office Action issued May 23, 2024 in corresponding Korean Patent Application No. 10-2022-7000312 with English translation.

\* cited by examiner

MANUFACTURING FACILITY DIAGNOSIS SUPPORT APPARATUS

CROSS-REFERENCE TO RELATED APPLICATION

The present application is based on PCT filing PCT/JP2020/025867, filed Jul. 1, 2020, the entire contents of which is incorporated herein by reference.

FIELD

The present disclosure relates to a manufacturing facility diagnosis support apparatus.

BACKGROUND

PTL 1 discloses a manufacturing facility diagnosis support apparatus. In diagnosis of a manufacturing facility in which similar apparatuses are installed, the diagnosis support apparatus can suppress influence of a factor other than a state of each of the apparatuses on the diagnosis.

CITATION LIST

Patent Literature

[PTL 1] JP 6572979 B2

SUMMARY

Technical Problem

The diagnosis support apparatus disclosed in PTL 1 diagnoses abnormality by comparison with past operation information on the manufacturing facility. When the past operation information on the manufacturing facility is not present, the diagnosis support apparatus cannot diagnose the manufacturing facility.

The present disclosure is made to solve the above-described issues. An object of the present disclosure is to provide a manufacturing facility diagnosis support apparatus that can support efficient diagnosis of a manufacturing facility even when past operation information on the manufacturing facility is not present.

Solution to Problem

A manufacturing facility diagnosis support apparatus according to the present disclosure includes a storage unit configured to store operation information in each of processes of a manufacturing facility for processing a material and information on a position of the material in association with each other, and an extraction unit configured to extract, when a range including the position of the material is designated, operation information changed at a position corresponding to the designated range, from the operation information stored in the storage unit.

Advantageous Effects of Invention

According to the present disclosure, when a range including a position of a material to be rolled is designated, the diagnosis support apparatus extracts operation information changed at the position corresponding to the range. Therefore, it is possible to support efficient diagnosis of the manufacturing facility even when past operation information on the manufacturing facility is not present.

DESCRIPTION OF EMBODIMENTS

A preferred embodiment is described with reference to accompanying drawings. Note that, in the drawings, the same or equivalent components are denoted by the same reference numerals. Repetitive descriptions of the components are appropriately simplified or omitted.

Embodiment 1

Figure 1:
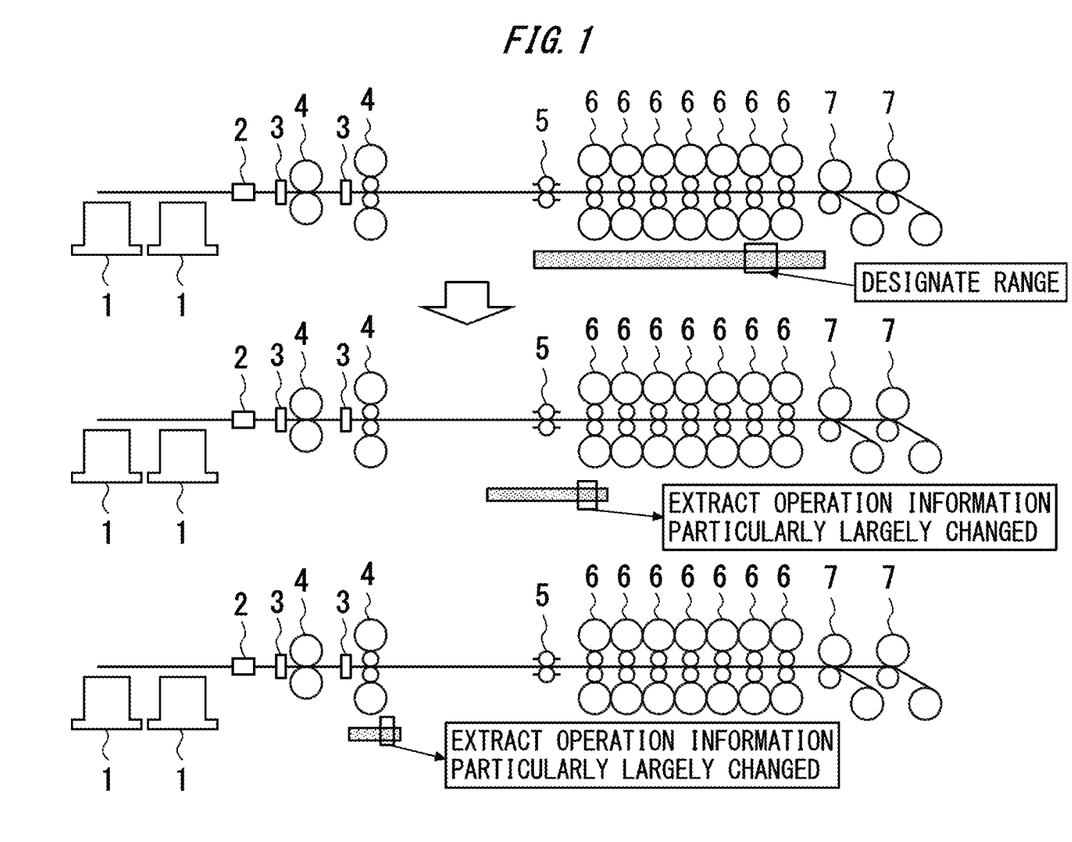
FIG. 1 is a configuration diagram of a rolling facility to which a manufacturing facility diagnosis support apparatus according to Embodiment 1 is applied.

FIG. 1 is a configuration diagram of a rolling facility to which a manufacturing facility diagnosis support apparatus according to Embodiment 1 is applied.

As illustrated in FIG. 1, the rolling facility includes a plurality of heating furnaces 1, a sizing press 2, a plurality of edgers 3, a plurality of roughing mills 4, a shear 5, a plurality of finishing mills 6, and a plurality of coilers 7.

The plurality of heating furnaces 1 are provided on the most upstream side of the rolling facility. The plurality of heating furnaces 1 are provided to heat a material to be rolled.

The sizing press 2 is provided on a downstream side of the plurality of heating furnaces 1. The sizing press 2 is provided to roll the material to be rolled in a width direction.

The plurality of edgers 3 are provided on the downstream side of the sizing press 2. The plurality of edgers 3 are provided to roll the material to be rolled in the width direction.

The plurality of roughing mills 4 are provided on the downstream side of the respective edgers 3. The plurality of roughing mills 4 are provided to roll the material to be rolled in a thickness direction.

The shear 5 is provided on the downstream side of the plurality of roughing mills 4. The shear 5 is provided to cut the material to be rolled.

The plurality of finishing mills 6 are provided on the downstream side of the shear 5. The plurality of finishing mills 6 are provided to roll the material to be rolled in the thickness direction.

The plurality of coilers 7 are provided on the downstream side of the plurality of finishing mills 6. The plurality of coilers 7 are provided to wind up the material to be rolled.

A diagnosis support apparatus 8 constantly or intermittently collects operation information indicating an operation state of each of the apparatuses in the rolling facility or a state of the material to be rolled. The diagnosis support apparatus 8 stores the operation information in each of processes of the rolling facility in association with information on a position of the material to be rolled. For example, the diagnosis support apparatus 8 stores, as the operation information, information on a load applied from an unillustrated measuring instrument to the material to be rolled, information on a current flowing through each of the apparatuses, information on a speed of the material to be rolled in each of the processes, information on presence/absence of a manual intervention signal, or other information.

When a range including an investigation target position of the material to be rolled is designated, the diagnosis support apparatus 8 extracts operation information changed at a position corresponding to the designated range, from the operation information stored in the own apparatus.

For example, as illustrated in an upper row of FIG. 1, in a case where abnormality of the material to be rolled is found in the process by the finishing mills 6 by a person in charge, a range including an abnormal position of the material to be rolled relating to the abnormality is designated. In this case, the diagnosis support apparatus 8 extracts operation information particularly largely changed at a position corresponding to the range.

For example, as illustrated in a middle row of FIG. 1, the diagnosis support apparatus 8 extracts operation information particularly largely changed in the process by the shear 5.

For example, as illustrated in a lower row of FIG. 1, the diagnosis support apparatus 8 extracts operation information particularly largely changed in the process by the roughing mill 4 on the downstream side.

A terminal apparatus 9 displays the operation information extracted by the diagnosis support apparatus 8.

Next, the diagnosis support apparatus 8 and the terminal apparatus 9 are described with reference to FIG. 2.

Figure 2:
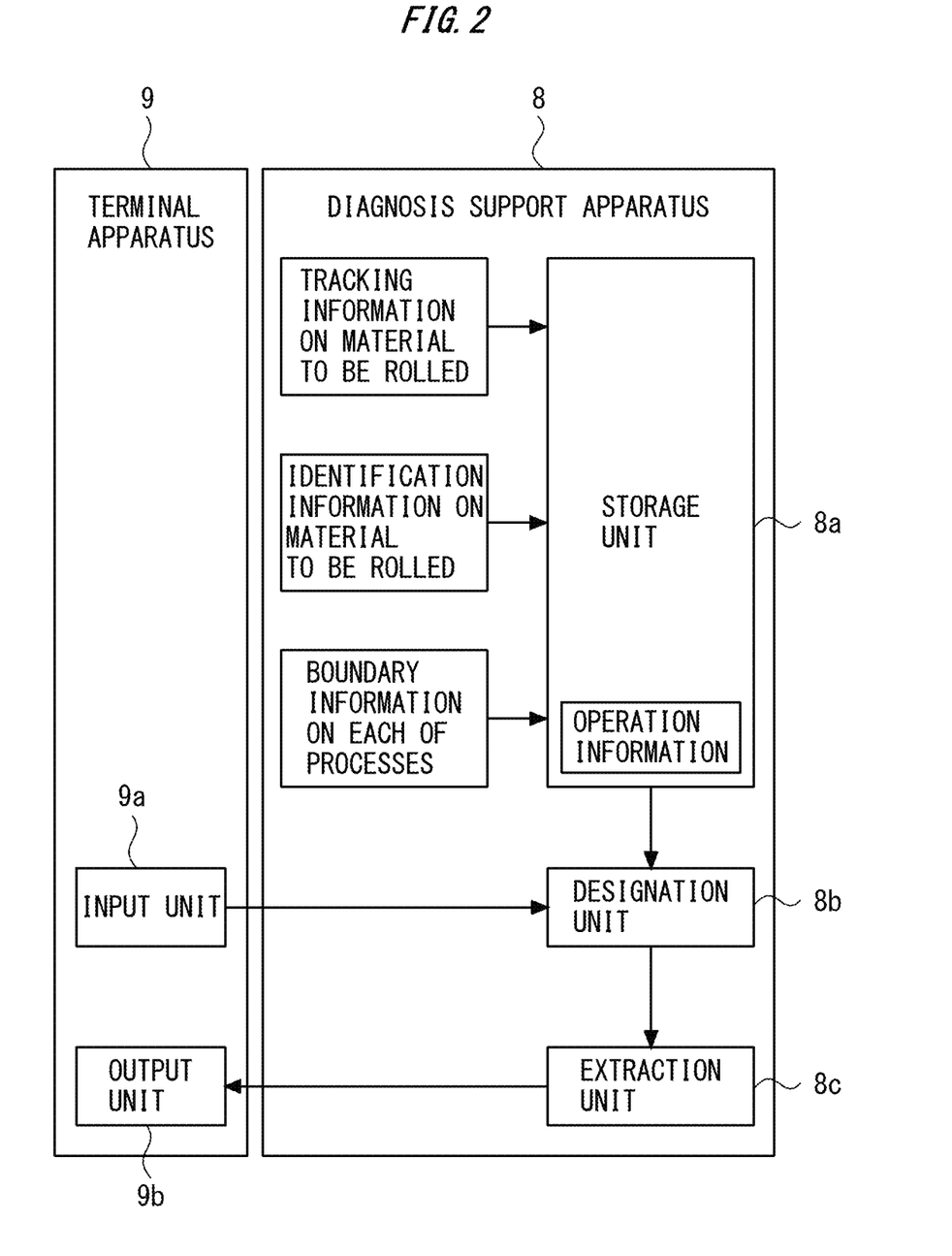
FIG. 2 is a block diagram illustrating the manufacturing facility diagnosis support apparatus and a terminal apparatus according to Embodiment 1.

FIG. 2 is a block diagram illustrating the manufacturing facility diagnosis support apparatus and the terminal apparatus according to Embodiment 1.

As illustrated in FIG. 2, the diagnosis support apparatus 8 includes a storage unit 8a, a designation unit 8b, and an extraction unit 8c.

The storage unit 8a stores identification information and tracking information on the material to be rolled in association with the operation information. At this time, the storage unit 8a recognizes a head end and a tail end of the material to be rolled based on boundary information on each of the processes. For example, the storage unit 8a recognizes the head end and the tail end of the material to be rolled by using, as the boundary information, information on load applied to the material to be rolled in each of the processes. For example, the storage unit 8a recognizes the head end of the material to be rolled when the load applied to the material to be rolled is abruptly increased from zero. For example, the storage unit 8a recognizes the tail end of the material to be rolled when the load applied to the material to be rolled abruptly becomes zero.

The designation unit 8b designates the material to be rolled and the range including the investigation target position of the material to be rolled based on information from outside. The designation unit 8b designates operation information corresponding to the range including the investigation target position of the material to be rolled, from the operation information stored in the storage unit 8a.

The extraction unit 8c extracts, as the changed operation information, operation information satisfying a preset condition from the operation information designated by the designation unit 8b. For example, in a case where the operation information is information indicating on or off of each of the processes in the rolling facility, the extraction unit 8c extracts operation information on a range where the process is switched from on to off or operation information on a range where the process is switched from off to on. For example, in a case where the operation information is information indicating a numerical value such as a temperature of the material to be rolled, the extraction unit 8c extracts operation information on a range where the numerical value is changed in a step-wise manner. For example, in the case where the operation information is information indicating the numerical value such as the temperature of the material to be rolled, the extraction unit 8c extracts operation information on a range where a value of a change rate per unit time is greater than a preset threshold. For example, in the case where the operation information is information indicating the numerical value such as the temperature of the material to be rolled, the extraction unit 8c extracts operation information on a range where the numerical value has a characteristic difference to past operation information. Note that, in the case where the operation information is information indicating the numerical value such as the temperature of the material to be rolled, the extraction unit 8c extracts operation information in a range where the numerical value is not changed at all.

The terminal apparatus 9 includes an input unit 9a and an output unit 9b.

The input unit 9a is provided to receive operation from outside. For example, in the diagnosis of the rolling facility, the input unit 9a transmits, to the diagnosis support apparatus 8, the information on the material to be rolled and the information designating the range including the investigation target position of the material to be rolled based on operation by a diagnostician of the rolling facility.

The output unit 9b receives information from outside. The output unit 9b outputs the information. For example, the output unit 9b displays the information. For example, the output unit 9b displays the operation information extracted by the extraction unit 8c. At this time, the output unit 9b displays the identification information on the material to be rolled and the identification information on each of the processes in association with the operation information.

Next, outline of the operation of the diagnosis support apparatus 8 is described with reference to FIG. 3.

Figure 3:
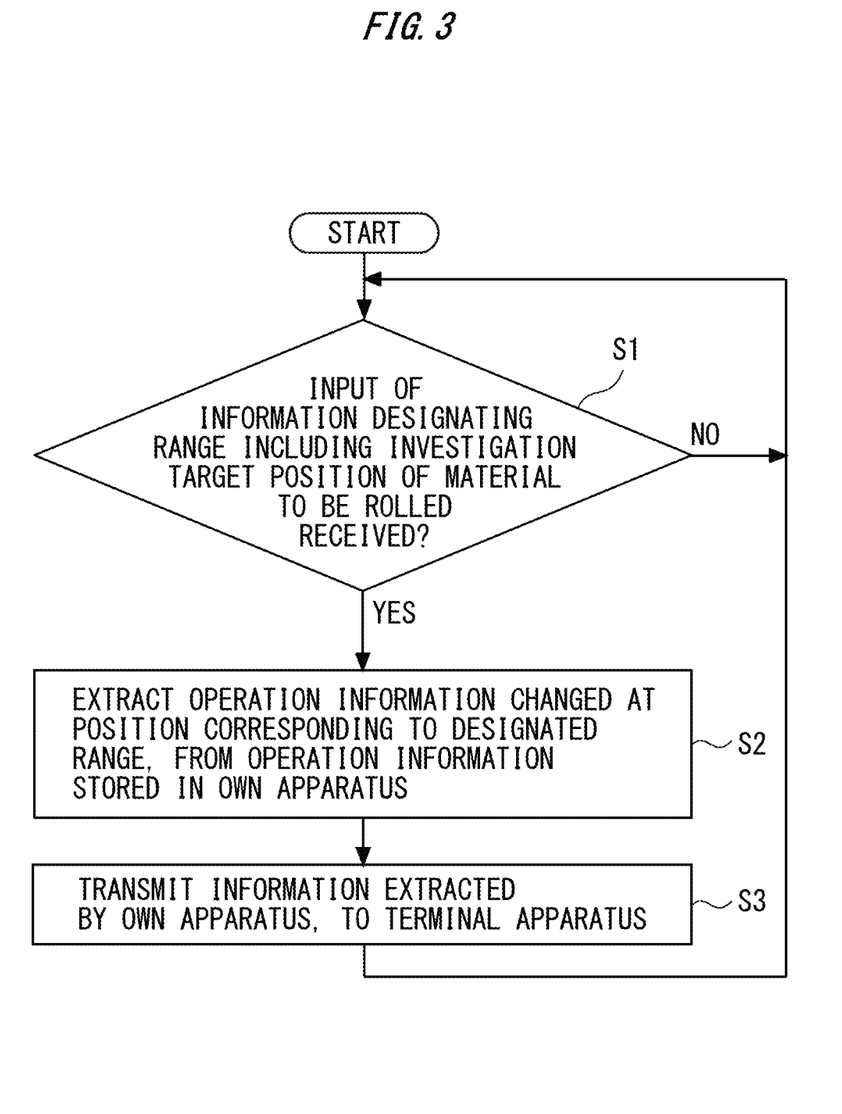
FIG. 3 is a flowchart to explain outline of operation of the manufacturing facility diagnosis support apparatus according to Embodiment 1.

FIG. 3 is a flowchart to explain the outline of the operation of the manufacturing facility diagnosis support apparatus according to Embodiment 1.

In step S1, the diagnosis support apparatus 8 determines whether input of the information designating the range including the investigation target position of the material to be rolled has been received. In a case where input of the information designating the range including the investigation target position of the material to be rolled has not been received in step S1, the diagnosis support apparatus 8 performs the operation in step S1. In a case where input of the information designating the range including the investigation target position of the material to be rolled has been received in step S1, the diagnosis support apparatus 8 performs operation in step S2.

In step S2, the diagnosis support apparatus 8 extracts operation information changed at a position corresponding to the designated range, from the operation information stored in the own apparatus. Thereafter, the diagnosis support apparatus 8 performs operation in step S3. In step S3, the diagnosis support apparatus 8 transmits the information extracted by the own apparatus, to the terminal apparatus 9. Thereafter, the diagnosis support apparatus 8 performs the operation in step S1.

According to Embodiment 1 described above, when the range including the position of the material to be rolled is designated, the diagnosis support apparatus 8 automatically extracts the operation information changed at the position corresponding to the range. Therefore, even a person in charge having little experience can support efficient diagnosis of the rolling facility even when past operation information on the manufacturing facility is not present. As a result, it is possible to early solve a trouble of the rolling facility.

At this time, when only the operation information in the process that is upstream of the process in which abnormality has been found is extracted, it is possible to more efficiently diagnose the rolling facility.

Further, the diagnosis support apparatus 8 extracts the operation information in which operation is switched from on to off or the operation information in which operation is switched from off to on at the position corresponding to the designated range. This makes it possible to more reliably grasp an abnormal event of the rolling facility.

Further, the diagnosis support apparatus 8 extracts the operation information satisfying the preset change condition at the position corresponding to the designated range. This makes it possible to more reliably grasp an abnormal event of the rolling facility.

Note that, when the operation information changed in the diagnosis support apparatus 8 is displayed on the terminal apparatus 9, the identification information on the corresponding process or the identification information on the corresponding apparatus may be displayed in association with the operation information. In this case, it is possible to more reliably grasp an abnormal event of the rolling facility.

Further, the processes by the plurality of apparatuses may be collected to one process. For example, the processes by the plurality of finishing mills 6 may be integrated into a single process. For example, the processes by the plurality of coilers 7 may be integrated into a single process. In this case, it is also possible to support efficient diagnosis of the rolling facility even when the past operation information on the manufacturing facility is not present.

Further, the diagnosis support apparatus 8 of Embodiment 1 may be applied to a manufacturing facility other than the rolling facility. For example, the diagnosis support apparatus 8 of Embodiment 1 may be applied to a papermaking facility for processing paper as a material. In this case, even a person in charge having little experience can support efficient diagnosis of the manufacturing facility even when past operation information on the manufacturing facility is not present.

Next, an example of the diagnosis support apparatus 8 is described with reference to FIG. 4.

Figure 4:
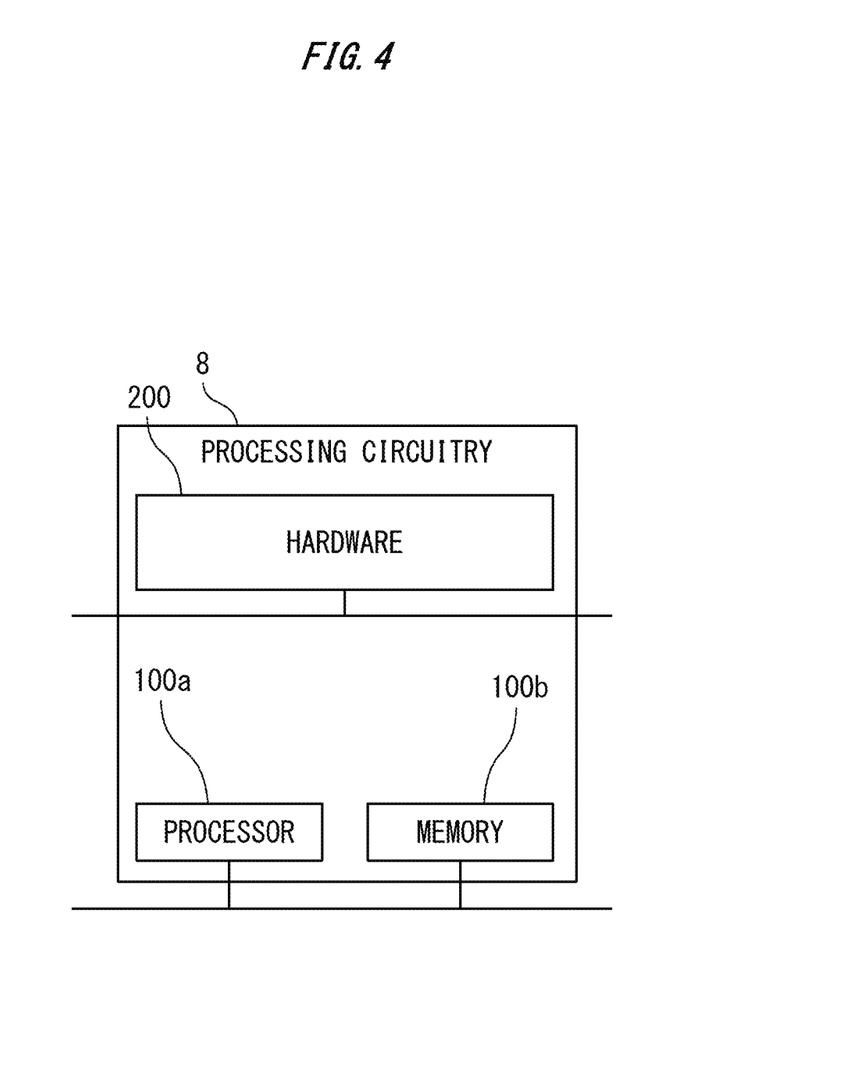
FIG. 4 is a hardware configuration diagram of the manufacturing facility diagnosis support apparatus according to Embodiment 1.

FIG. 4 is a hardware configuration diagram of the manufacturing facility diagnosis support apparatus according to Embodiment 1.

The functions of the diagnosis support apparatus 8 can be realized by processing circuitry. For example, the processing circuitry includes at least one processor 100a and at least one memory 100b. For example, the processing circuitry includes at least one dedicated hardware 200.

In a case where the processing circuitry includes the at least one processor 100a and the at least one memory 100b, each of the functions of the diagnosis support apparatus 8 is realized by software, firmware, or a combination of the software and the firmware. At least one of the software and the firmware is described as a program. At least one of the software and the firmware is stored in the at least one memory 100b. The at least one processor 100a reads out and executes a program stored in the at least one memory 100b, to realize each of the functions of the diagnosis support apparatus 8. The at least one processor 100a is also referred to as a central processing unit, a processing device, a calculation device, a microprocessor, a microcomputer, or a DSP. For example, the at least one memory 100b is a nonvolatile or volatile semiconductor memory such as a RAM, a ROM, a flash memory, an EPROM, and an EEPROM, a magnetic disk, a flexible disk, an optical disk, a compact disk, a minidisk, or a DVD.

In the case where the processing circuitry includes the at least one dedicated hardware 200, the processing circuitry is realized by, for example, a single circuit, a composite circuit, a programmed processor, a parallel-programmed processor, an ASIC, a FPGA, or a combination thereof. For example, the functions of the diagnosis support apparatus 8 are each realized by the processing circuitry. For example, the functions of the diagnosis support apparatus 8 are collectively realized by the processing circuitry.

A part of the functions of the diagnosis support apparatus 8 may be realized by the dedicated hardware 200, and the other functions may be realized by the software or the firmware. For example, the function of the extraction unit 8c may be realized by the processing circuitry as the dedicated hardware 200, and the functions other than the function of the extraction unit 8c may be realized in such a manner that the at least one processor 100a reads out and executes programs stored in the at least one memory 100b.

As described above, the processing circuitry realizes the functions of the diagnosis support apparatus 8 by the hardware 200, the software, the firmware, or a combination thereof.

INDUSTRIAL APPLICABILITY

As described above, the manufacturing facility diagnosis support apparatus of the present disclosure can be used in a system.

REFERENCE SIGNS LIST

1 Heating furnace
2 Sizing press
3 Edger
4 Roughing mill
5 Shear
6 Finishing mill
7 Coiler
8 Diagnosis support apparatus
8a Storage unit
8b Designation unit
8c Extraction unit
9 Terminal apparatus
9a Input unit
9b Output unit
100a Processor
100b Memory
200 Hardware

The invention claimed is:

1. A manufacturing facility diagnosis support apparatus, comprising:
  a storage unit configured to store operation information in each of processes of a manufacturing facility for transferring and for processing a material to be rolled, and information on a position of the material to be rolled in association with each other;
  a designation unit configured to designate a range including investigation target position of the material to be rolled in a transfer direction by operation from outside; and an extraction unit configured to extract specific operation information in a specific process of current processes of the manufacturing facility, the specific operation information corresponding to the designated range including the investigation target position of the material, the specific operation information indicating that a value of a change rate per unit time in the specific process is greater than a preset threshold from the operation information of the current processes of the manufacturing facility stored in the storage unit, without using operation information of past processes of the manufacturing facility for another material to be rolled, wherein the operation information includes temperature of the material to be rolled, only the specific operation information in the specific process that is upstream of the process in which abnormality has been found is extracted from the current processes of the manufacturing facility, and the manufacturing facility diagnosis support apparatus controls transmission of the specific operation information to a terminal apparatus as detection of an abnormal event of the manufacturing facility.

2. The manufacturing facility diagnosis support apparatus according to claim 1, wherein the operation information includes at least one of the temperature of the material to be rolled, load applied to the material to be rolled, or a speed of the material to be rolled, in each process of the current processes of the manufacturing facility.

3. The manufacturing facility diagnosis support apparatus according to claim 1, wherein two or more processes of the current processes of the manufacturing facility is grouped as a single process to be extracted.

4. The manufacturing facility diagnosis support apparatus according to claim 1, wherein the specific operation information is displayed with identification information of the material to be rolled and identification information of the specific process as detection of the abnormal event of the manufacturing facility, by a terminal apparatus.

5. A manufacturing facility diagnosis support apparatus, comprising:

a non-transitory computer readable storage device that stores operation information in each of processes of a manufacturing facility that transfer and process a material to be rolled, and information on a position of the material to be rolled in association with each other, the operation information including temperature of the material to be rolled; and circuitry configured to designate, a range including investigation target position of the material to be rolled in a transfer direction by an external operation, extract specific operation information in a specific process of the current processes of the manufacturing facility, the specific operation information corresponding to the designated range including the investigation target position of the material, the specific operation information indicating that a value of a change rate per unit time in the specific process is greater than a preset threshold, from the operation information of the current processes of the manufacturing facility stored in the non-transitory computer readable storage device, without using operation information of past processes of the manufacturing facility for another material to be rolled, and control transmission of the specific operation information to a terminal apparatus as detection of an abnormal event of the manufacturing facility, wherein only the specific operation information in the specific process that is upstream of the process in which abnormality has been found is extracted from the current processes of the manufacturing facility.

6. The manufacturing facility diagnosis support apparatus according to claim 5, wherein the operation information includes at least one of the temperature of the material to be rolled, load applied to the material to be rolled, or a speed of the material to be rolled, in each process of the current processes of the manufacturing facility.

7. The manufacturing facility diagnosis support apparatus according to claim 5, wherein two or more processes of the current processes of the manufacturing facility is grouped as a single process to be extracted.

8. The manufacturing facility diagnosis support apparatus according to claim 5, wherein the specific operation information is displayed with identification information of the material to be rolled and identification information of the specific process as detection of the abnormal event of the manufacturing facility, by a terminal apparatus.

9. A manufacturing facility diagnosis support method, the method comprising:

storing operation information in each of processes of a manufacturing facility for transferring and for processing a material to be rolled, and information on a position of the material to be rolled in association with each other, the operation information including being temperature of the material to be rolled;

designating a range including investigation target position of the material to be rolled in a transfer direction by operation from outside;

extracting specific operation information in a specific process of current processes of the manufacturing facility, the specific operation information corresponding to the designated range including the investigation target position of the material, the specific operation information indicating that a value of a change rate per unit time in the specific process is greater than a preset threshold, from the operation information of the current processes of the manufacturing facility, without using operation information of past processes of the manufacturing facility for another material to be rolled; and controlling transmission of the specific operation information to a terminal apparatus as detection of an abnormal event of the manufacturing facility, wherein only the specific operation information in the specific process that is upstream of the process in which abnormality has been found is extracted from the current processes of the manufacturing facility.

10. The manufacturing facility diagnosis support method according to claim 9, wherein the operation information includes at least one of the temperature of the material to be rolled, load applied to the material to be rolled, or a speed of the material to be rolled, in each process of the current processes of the manufacturing facility.

11. The manufacturing facility diagnosis support method according to claim 9, wherein two or more processes of the current processes of the manufacturing facility is grouped as a single process to be extracted.

12. The manufacturing facility diagnosis support method according to claim 9,
wherein the specific operation information is displayed with identification information of the material to be rolled and identification information of the specific process as detection of the abnormal event of the manufacturing facility, by a terminal apparatus.

* * * * *